US012656190B2

(12) United States Patent (10) Patent No.: US 12,656,190 B2

Kumagai et al. (45) Date of Patent: Jun. 16, 2026

(54) TEMPERATURE MEASURING DEVICE AND TEMPERATURE MEASURING METHOD

(71) Applicants: Yokogawa Electric Corporation, Tokyo (JP); TOYOTA SCHOOL FOUNDATION, Aichi (JP)

(72) Inventors: Yoshihiro Kumagai, Musashino (JP); Shin-ichirou Tezuka, Musashino (JP); Satoshi Matsuura, Musashino (JP); Kazuya Saito, Nagoya (JP)

(73) Assignees: Yokogawa Electric Corporation, Tokyo (JP); TOYOTA SCHOOL FOUNDATION, Aichi (JP)

( * ) Notice: Subject to any disclaimer, the term of this patent is extended or adjusted under 35 U.S.C. 154(b) by 352 days.

(21) Appl. No.: 18/218,643

(22) Filed: Jul. 6, 2023

(65) Prior Publication Data

US 2024/0011848 A1 Jan. 11, 2024

(30) Foreign Application Priority Data

Jul. 8, 2022 (JP) ................................. 2022-110200

(51) Int. Cl.
*G01K 11/322* (2021.01)
*G01K 15/00* (2006.01)
(52) U.S. Cl.
CPC .......... *G01K 11/322* (2021.01); *G01K 15/007* (2013.01)
(58) Field of Classification Search
CPC .... G01K 11/322; G01K 11/32; G01K 11/324; G01K 11/3206; G01K 15/007; G01K 1/026
See application file for complete search history.

(56) References Cited

U.S. PATENT DOCUMENTS

| | | | |
|---|---|---|---|
| 6,237,421 B1 | 5/2001 | Li et al. | |
| 7,529,434 B2 | 5/2009 | Tavemer et al. | |
| 7,534,031 B2 * | 5/2009 | Yamamoto .............. | G01K 11/32 |
| | | | 374/E17.002 |

FOREIGN PATENT DOCUMENTS

| | | | | |
|---|---|---|---|---|
| CA | 2619317 C | * | 3/2011 | ......... G01K 11/3206 |
| CN | 101246056 A | * | 8/2008 | .......... G01M 11/319 |

(Continued)

OTHER PUBLICATIONS

Japanese Office Action (JPOA) dated Apr. 22, 2025 for Japanese Patent Application No. 2022-110200; English machine translation.

(Continued)

*Primary Examiner* — Michael P Stafira

(74) *Attorney, Agent, or Firm* — RANKIN, HILL & CLARK LLP

(57) ABSTRACT

A temperature measuring device 10 includes a spectrum data acquirer 11 configured to acquire spectrum data that indicates a spectrum of Brillouin scattered light generated by causing light to be incident on an optical fiber FUT, a spectrum data analyzer 12 configured to analyze the spectrum data and to obtain a Brillouin frequency shift amount, a corrector 13 configured to predict an amount of change in the Brillouin frequency shift amount due to structural relaxation of the optical fiber FUT from a thermal history of the optical fiber FUT, and configured to correct the Brillouin frequency shift amount obtained by the spectrum data analyzer 12 using the predicted amount of change, and a temperature calculator 14 configured to obtain a temperature of the optical fiber FUT on the basis of the Brillouin frequency shift amount corrected by the corrector 13.

19 Claims, 6 Drawing Sheets

(56) References Cited

FOREIGN PATENT DOCUMENTS

| | | | | | |
|----|----------------|----|---|---------|-----------------------|
| CN | 102589748 | A | * | 7/2012 | |
| CN | 102980681 | A | * | 3/2013 | |
| CN | 106840017 | A | * | 6/2017 | ............. G01B 11/16 |
| EP | 3488191 | B1 | * | 8/2021 | ......... G01D 5/35361 |
| FR | 3007833 | A1 | * | 1/2015 | ............. G01K 11/32 |
| JP | H04106434 | A | | 4/1992 | |
| JP | 2000074697 | A | | 3/2000 | |
| JP | 2005241643 | A | * | 9/2005 | ............. G01B 11/18 |
| JP | 2007256052 | A | | 10/2007 | |
| JP | 2009080049 | A | * | 4/2009 | |
| JP | 4775094 | B2 | * | 9/2011 | .......... G01K 11/322 |
| JP | 5012032 | B2 | | 8/2012 | |
| JP | 2014164053 | A | | 9/2014 | |
| JP | 2015010877 | A | * | 1/2015 | |
| JP | 2016042005 | A | | 3/2016 | |
| JP | 6068278 | B2 | * | 1/2017 | |
| JP | 6283602 | B2 | * | 2/2018 | |
| JP | 6358277 | B2 | * | 7/2018 | ......... G01D 5/35364 |
| JP | 6376261 | B1 | * | 8/2018 | ......... G01D 5/35332 |
| JP | 2019060743 | A | * | 4/2019 | ............. G01K 11/32 |
| JP | 2019522206 | A | * | 8/2019 | ......... G01D 5/35361 |
| JP | 2021131292 | A | * | 9/2021 | |
| JP | 2022040695 | A | * | 3/2022 | |
| WO | WO-2007043432 | A1 | * | 4/2007 | ............. G01K 11/32 |

OTHER PUBLICATIONS

Japanese Office Action (JPOA) dated Dec. 24, 2024 issued for Japanese patent application No. 2022-110200 and its English machine translation.

* cited by examiner

FIG. 7A
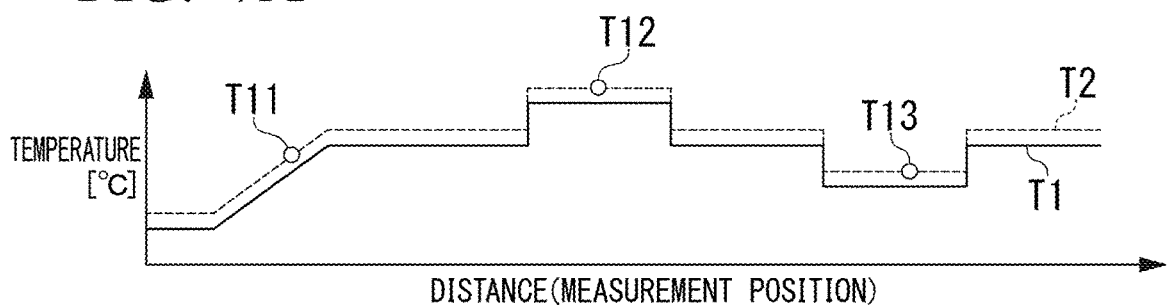
DISTANCE(MEASUREMENT POSITION)
FIG. 7B
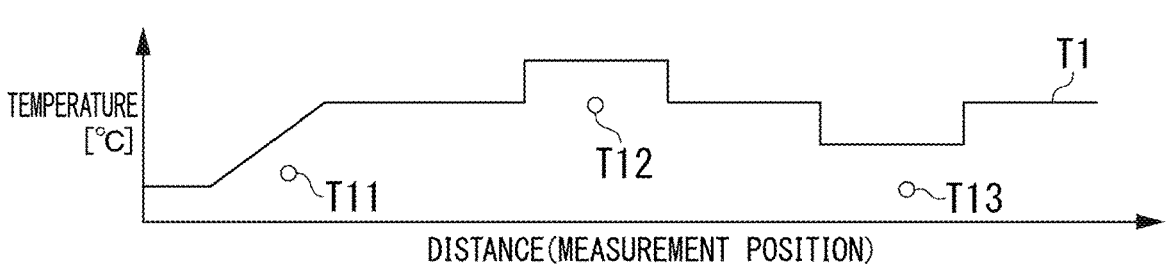
DISTANCE(MEASUREMENT POSITION)
FIG. 7C
DISTANCE(MEASUREMENT POSITION)
FIG. 7D
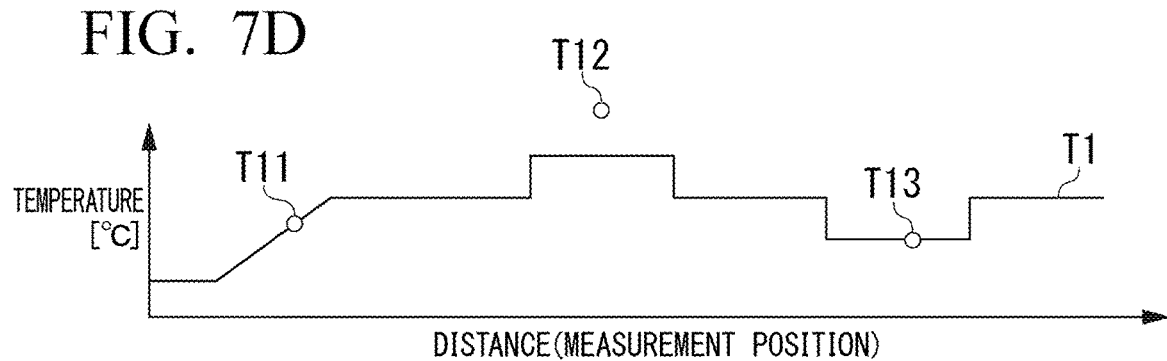
DISTANCE(MEASUREMENT POSITION)

1

TEMPERATURE MEASURING DEVICE AND TEMPERATURE MEASURING METHOD

BACKGROUND OF THE INVENTION

Field of the Invention

The present invention relates to a temperature measuring device and a temperature measuring method using an optical fiber sensor.

Priority is claimed on Japanese Patent Application No. 2022-110200, filed on Jul. 8, 2022, the contents of which are incorporated herein by reference.

Description of Related Art

Brillouin scattered light, which is generated by causing light to be incident on an optical fiber, changes its spectrum (a frequency at which the level reaches its maximum) according to changes in temperature or strain of the optical fiber. The optical fiber sensor, which utilizes this property, detects changes in the frequency of the Brillouin scattered light (Brillouin frequency shift: BFS) in a length direction of the optical fiber, thereby measuring a temperature distribution or strain distribution in the length direction of the optical fiber.

As typical examples of such an optical fiber sensor, a Brillouin optical correlation domain reflectometry (BOCDR) method, a Brillouin optical correlation domain analysis (BOCDA) method, and the like are known. Japanese Patent No. 5012032 discloses an optical fiber sensor that measures a temperature distribution in the length direction of an optical fiber, which can be applied to the BOCDA method and the like.

Incidentally, in recent years, there has been demand for a temperature measurement in a high-temperature environment with high accuracy over a long period of time in industries such as the plant industry, the heavy electric industry, and the upstream oil and natural gas industry. For example, it is demanded to perform a temperature measurement in a high-temperature environment in which the temperature is 300° C. or higher with high accuracy over a long period of tens of thousands of hours or more. Since an optical fiber sensor disclosed in Japanese Patent No. 5012032 is assumed to perform a temperature measurement in a relatively low-temperature environment (for example, a normal temperature to 300° C. or lower), it is difficult to meet such demands.

SUMMARY

A temperature measuring device may include: an acquirer configured to acquire spectrum data that indicates a spectrum of Brillouin scattered light generated by causing light to be incident on an optical fiber; an analyzer configured to analyze the spectrum data and to obtain a Brillouin frequency shift amount; a corrector configured to predict an amount of change in the Brillouin frequency shift amount due to structural relaxation of the optical fiber from a thermal history of the optical fiber, and configured to correct the Brillouin frequency shift amount obtained by the analyzer using the predicted amount of change; and a temperature calculator configured to obtain a temperature of the optical fiber on the basis of the Brillouin frequency shift amount corrected by the corrector.

2

Further features and aspects of the present disclosure will become apparent from the following detailed description of exemplary embodiments with reference to the attached drawings.

BRIEF DESCRIPTION OF THE DRAWINGS

FIGS. 7A to 7D are diagrams for describing processing performed by the temperature measuring device according to the second embodiment of the present invention.

DETAILED DESCRIPTION OF THE INVENTION

Figure 1:
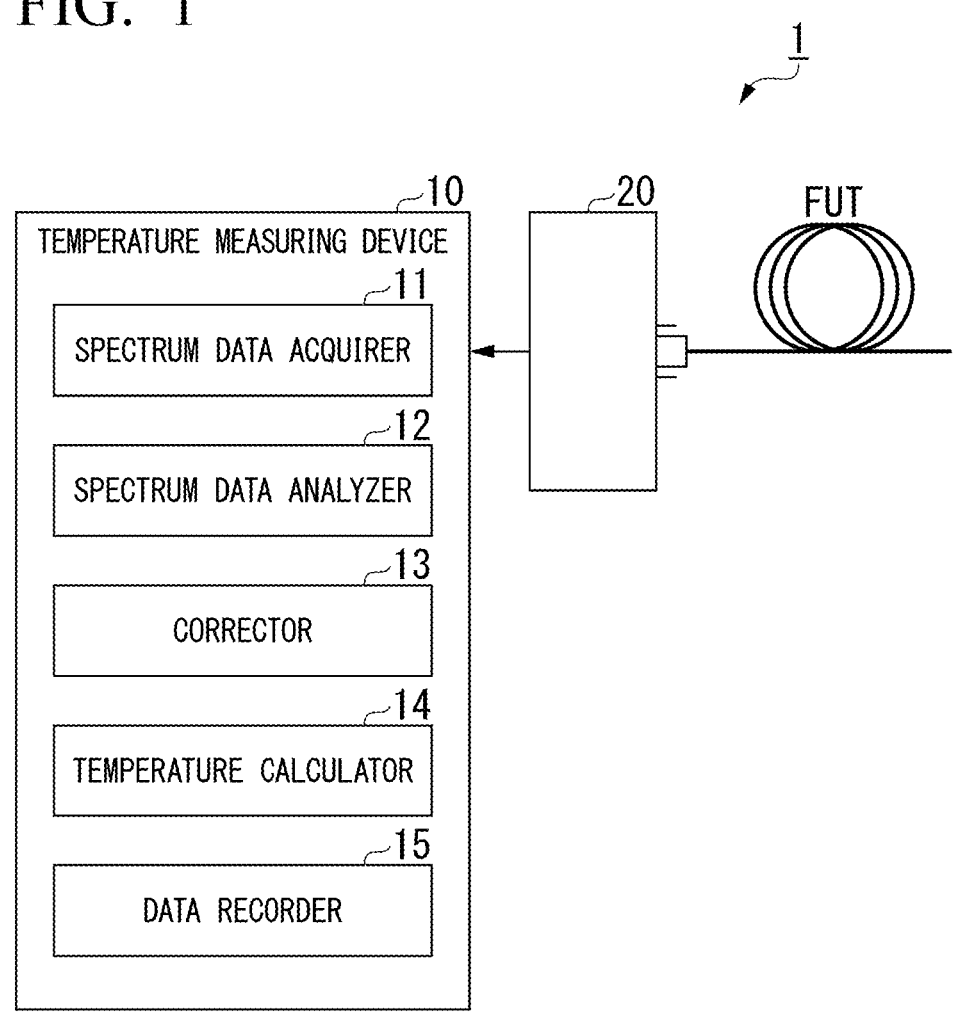
FIG. 1 is a block diagram which shows a configuration of a main part of a temperature measuring device according to a first embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a temperature measuring device and a temperature measuring method that can perform a temperature measurement in a high-temperature environment with high accuracy over a long period of time.

Hereinafter, a temperature measuring device and a temperature measuring method according to embodiments of the present invention will be described in detail with reference to the drawings. In the following description, first, an outline of the embodiments of the present invention will be described, and details of each embodiment of the present invention will be subsequently described.

[Outline]

Embodiments of the present invention enable a temperature measurement in a high-temperature environment to be performed with high accuracy over a long period of time. Specifically, an optical fiber sensor that measures a temperature distribution in a length direction of an optical fiber makes it possible to perform, for example, a temperature measurement in a high-temperature environment with a temperature of 300° C. or higher with high accuracy over a long period of tens of thousands of hours or more.

An optical fiber made of silica glass has a high melting point of 1000° C. or higher, and can be used in a high-temperature environment of 300° C. or higher. By using such an optical fiber with a high melting point, it is considered possible to realize an optical fiber sensor capable of a temperature measurement in a high-temperature environment.

In general, as a distributed temperature sensor (DTS) that uses an optical fiber as a temperature measurement sensor, a DTS in a Raman optical time domain reflectometry (ROTDR) method using Raman scattered light is known. A temperature measurement range of this DTS in the ROTDR method is limited to 300° C. or lower due to problems such as an increase in transmission loss of the optical fiber that is a sensor in a high-temperature environment.

On the other hand, the DTS, which uses Brillouin scattering, calculates a temperature based on a frequency difference (Brillouin frequency shift: BFS) between incident light and Brillouin scattered light, so that it is hardly affected by changes in transmission loss of an optical fiber. For this reason, in the DTS using Brillouin scattering, realization of a temperature measurement in a high temperature environment of 300° C. or higher can be expected by using the optical fiber described above with a high melting point.

Brillouin scattering is scattering by acoustic waves within optical fibers. Brillouin scattering includes spontaneous Brillouin scattering and stimulated Brillouin scattering. Spontaneous Brillouin scattering is scattering by acoustic waves naturally present in optical fibers. Stimulated Brillouin scattering is a scattering phenomenon caused by an interaction of two types of light: light caused to be incident from one end of an optical fiber (pump light) and light caused to be incident from the other end of the optical fiber (probe light whose frequency is about 11 [GHz] lower than that of the pump light).

Typical examples of a DTS using spontaneous Brillouin scattering include a DTS in the BOCDR method described above and a DTS in a Brillouin optical time domain reflectometry (BOTDR) method. In addition, typical examples of a DTS using stimulated Brillouin scattering include a DTS in the BOCDA method and a DTS in a Brillouin optical time domain analysis (BOTDA) method.

Here, inventors of the present application have conducted intensive experiments and found that a measured Brillouin frequency shift amount of the optical fiber sensor changes (drifts) over time in a high-temperature environment with a constant temperature. Such a change in Brillouin frequency shift amount is considered to be caused by a phenomenon called structural relaxation in which a structure of an optical fiber (glass) changes in a high-temperature environment. When such a change in Brillouin frequency shift amount occurs, a difference between a temperature measured by the optical fiber sensor (a temperature obtained based on the Brillouin frequency shift amount) and an actual temperature occurs, and the difference becomes a measurement error. In addition, since the Brillouin frequency shift amount changes over time as described above, the measurement error increases as time elapses.

In the embodiments of the present invention, spectrum data indicating a spectrum of Brillouin scattered light generated by causing light to be incident on an optical fiber is first acquired. Next, the spectrum data is analyzed to obtain the Brillouin frequency shift amount. Next, an amount of change in the Brillouin frequency shift amount due to the structural relaxation of the optical fiber is predicted based on a thermal history of the optical fiber, and the predicted amount of change is used to correct the obtained Brillouin frequency shift amount. Then, a temperature of the optical fiber is obtained on the basis of the corrected Brillouin frequency shift amount. As a result, it is possible to perform a temperature measurement in a high-temperature environment with high accuracy over a long period of time.

First Embodiment

<Configuration of Temperature Measuring Device>

FIG. 1 is a block diagram which shows a configuration of a main part of a temperature measuring device according to a first embodiment of the present invention. As shown in FIG. 1, a temperature measuring device 10 of the present embodiment includes a spectrum data acquirer 11 (an acquirer), a spectrum data analyzer 12 (an analyzer), a corrector 13, a temperature calculator 14, and a data recorder 15.

Such a temperature measuring device 10 constitutes an optical fiber sensor system 1 together with an optical fiber sensor main body 20. The optical fiber sensor system 1 is a system in which the temperature measuring device 10 acquires and analyzes spectrum data detected by the optical fiber sensor main body 20 to obtain a temperature distribution in a length direction of an optical fiber FUT.

The optical fiber sensor system 1 shown in FIG. 1 can also measure a distribution of a strain applied to the optical fiber FUT in addition to the temperature distribution in the length direction of the optical fiber FUT. In the present embodiment, for simplicity of description, it is assumed that the optical fiber FUT is not affected by the strain. Examples of a method of preventing the optical fiber FUT from being affected by the strain include, for example, a method of inserting the optical fiber FUT into a metal tube without being fixed, and fixing the metal tube in which the optical fiber FUT is inserted to a measurement object that is an object whose temperature is measured.

The optical fiber sensor main body 20 causes light to be incident on the optical fiber FUT and detects Brillouin scattered light generated by causing the light to be incident on the optical fiber FUT. In addition, the optical fiber sensor main body 20 performs signal processing on a detection signal obtained by detecting the Brillouin scattered light, and outputs spectrum data indicating a spectrum of the Brillouin scattered light generated within the optical fiber FUT. The optical fiber sensor main body 20 may be a DTS in any one of the BOCDR method, the BOCDA method, the BOTDR method, and the BOTDA method.

The DTS in the BOCDR method described above causes pump light, which is frequency-modulated continuous light or pulse light, to be incident from one end of the optical fiber FUT, and causes it to interfere with natural Brillouin scattered light and reference light obtained from the same end of the optical fiber FUT. As a result, it selectively extracts natural Brillouin scattered light at a specific position where a "correlation peak" appears in the optical fiber FUT, and outputs spectrum data indicating a spectrum of the extracted natural Brillouin scattered light.

The DTS in the BOCDA method described above causes the frequency-modulated continuous light or pulse light (pump light and probe light) to be incident from both ends of the optical fiber FUT. Then, it extracts amplified induced Brillouin scattered light at a position where modulation phases of the pump light and the probe light match (the position where the correlation peak appears), and outputs spectrum data indicating a spectrum of the extracted induced Brillouin scattered light.

The DTS in the BOTDR method described above causes the pulse light to be incident from one end of the optical fiber FUT. Then, it sequentially detects the natural Brillouin scattered light emitted from the same end of the optical fiber FUT, and outputs spectrum data indicating a spectrum of the detected natural Brillouin scattered light.

The DTS in the BOTDA method described above causes pulse light (pump light) whose frequency is variable to be incident from one end of the optical fiber FUT, and causes probe light, which is continuous light, to be incident from the other end of the optical fiber FUT. Then, it sequentially detects induced Brillouin scattered light caused by the interaction between the pump light and the probe light, and outputs spectrum data indicating a spectrum of the detected induced Brillouin scattered light.

The spectrum data acquirer 11 acquires spectrum data output from the optical fiber sensor main body 20. The optical fiber sensor main body 20 normally performs measurements at a plurality of measurement positions set in the length direction of the optical fiber FUT. For this reason, the spectrum data acquirer 11 acquires spectrum data indicating a spectrum of Brillouin scattered light generated at each of the measurement positions.

Spectrum data acquired by the spectrum data acquirer 11 is, so to speak, three-dimensional data that is a combination of information on a position (distance) of the optical fiber FUT in the length direction, information on a frequency axis of a Brillouin scattering spectrum, and information on an intensity of the Brillouin scattering spectrum. When a lot of noise is superimposed on the spectrum data acquired by the spectrum data acquirer 11, the noise may also be reduced by using low-pass filtering.

Note that the measurement position described above is a position at which a temperature is measured, and is a position of the optical fiber FUT in the length direction set by a user. To record a thermal history of the optical fiber FUT, it is desirable that this measurement position be set with intervals as short as possible over an entire longitudinal direction of the optical fiber FUT, excluding sections in which the temperature is not measured (sections where no temperature measurement is scheduled).

The spectrum data analyzer 12 analyzes the spectrum data acquired by the spectrum data acquirer 11 and obtains the Brillouin frequency shift amount. Specifically, the spectrum data analyzer 12 performs, for example, various types of processing such as curve fitting processing on each piece of the spectrum data acquired by the spectrum data acquirer 11 to obtain a peak frequency. Then, the spectrum data analyzer 12 obtains a difference between a frequency of light incident on the optical fiber FUT and a peak frequency obtained from each piece of the spectrum data as the Brillouin frequency shift amount at each of the measurement positions.

The corrector 13 predicts the amount of change in the Brillouin frequency shift amount due to the structural relaxation of the optical fiber FUT based on the thermal history of the optical fiber FUT, and corrects the Brillouin frequency shift amount obtained by the spectrum data analyzer 12 using the predicted amount of change. Specifically, the corrector 13 predicts the amount of change at each of the measurement positions based on the thermal history at each of the measurement positions. Then, the corrector 13 corrects the Brillouin frequency shift amount at each of the measurement positions obtained by the spectrum data analyzer 12 using the predicted amount of change at each of the measurement positions. Such correction is performed so that a temperature measurement in a high-temperature environment (for example, 300° C. or higher) can be performed with high accuracy over a long period of time (for example, tens of thousands of hours or more).

The corrector 13 predicts the amount of change in the Brillouin frequency shift amount due to the structural relaxation of the optical fiber FUT described above using a fictive temperature prediction equation that indicates a time-dependent change in a fictive temperature of the optical fiber FUT. The fictive temperature prediction equation described above is an equation represented using the fictive temperature in an initial state of the optical fiber FUT and a relaxation time for each temperature.

Here, the fictive temperature is a temperature that indicates how many degrees of a stable structure of a super-cooled liquid a glass structure corresponds to. The fictive temperature changes while a structure of the optical fiber FUT is relaxing, and stops changing when the structural relaxation has converged. For this reason, it can be determined whether the structure of the optical fiber FUT is relaxing or whether the structural relaxation has converged depending on a presence or absence of a change in the fictive temperature. In this manner, by measuring the fictive temperature, it is possible to qualitatively measure (ascertain) a state of the structural relaxation of the optical fiber FUT. Note that the fictive temperature when the structural relaxation has converged matches an ambient temperature.

The fictive temperature of the optical fiber FUT can be measured by measuring changes in a density and a refractive index of the optical fiber FUT. In addition, the fictive temperature of the optical fiber FUT can also be measured using spectroscopic methods such as infrared spectroscopy and Raman spectroscopy. A fairly large sample is required when the fictive temperature is measured by the former method, but a sample may be decreased in size when the fictive temperature is measured by the latter method. In the latter measurement method, it is also possible to measure the fictive temperature of a minute area.

The fictive temperature in the initial state of the optical fiber FUT and the relaxation time for each temperature, used in the fictive temperature prediction equation described above, are obtained in advance by using an optical fiber that has the same core diameter, structure, composition, and appearance (outer covering such as coating) as those of the optical fiber FUT. The fictive temperature in the initial state of the optical fiber FUT can be measured by using the method of measuring changes in the density and the refractive index of the optical fiber FUT, or using the spectroscopic methods such as infrared spectroscopy and Raman spectroscopy. The relaxation time can be obtained in advance by performing heat treatment (annealing processing) on the optical fiber.

Note that a time required for the structural relaxation of the optical fiber FUT to converge becomes shorter as an annealing temperature (a temperature of the heat treatment performed on the optical fiber) increases, and becomes longer as the annealing temperature decreases. For this reason, a relaxation time that can be obtained by actually performing the annealing processing on the optical fiber is actually obtained when the annealing temperature is 800° C. or higher. The relaxation time when the annealing temperature is lower than 800° C. can be obtained by extrapolating the relaxation time obtained when the annealing temperature is 800° C. or higher.

The corrector 13 changes the used fictive temperature prediction equation when a change in temperature has occurred. Specifically, the corrector 13 changes the fictive temperature prediction equation to one represented using the relaxation time of a temperature newly obtained by the temperature calculator 14 when a difference between the temperature newly obtained by the temperature calculator 14 and a temperature previously obtained by the temperature calculator 14 is greater than a predetermined threshold value.

Here, the threshold value described above affects the measurement error of the temperature measuring device 10. For example, when the threshold value is set as 50° C., a fictive temperature prediction equation in which a predicted temperature differs from an actual temperature by up to 50° C. is to be used. For this reason, it is desirable to set the threshold value to a small value to reduce the measurement error. For example, the threshold value described above may be set to approximately 1° C. Details of the fictive temperature prediction equation described above will be described below.

The temperature calculator 14 obtains a temperature at each of the plurality of measurement positions set in the length direction of the optical fiber FUT on the basis of the Brillouin frequency shift amount corrected by the corrector 13. Specifically, the temperature calculator 14 obtains a temperature T using a conversion equation shown in the following Equation (1), where ν is the Brillouin frequency shift amount corrected by the corrector 13.

[Math 1]

$$T = a \cdot \nu^2 + b \cdot \nu + c \tag{1}$$

In Equation (1) described above, a and b are coefficients, and c is a constant. These coefficients a and b and a constant c are calculated by, for example, performing curve fitting processing or the like on data indicating a relationship between a Brillouin frequency shift amount and a temperature, which is obtained by performing an experiment in advance. Note that an optical fiber used to obtain the relationship between the Brillouin frequency shift amount and the temperature is an optical fiber with no thermal history (or which can be regarded as having no thermal history).

The data recorder 15 records various types of data obtained by the temperature measuring device 10. Specifically, the data recorder 15 records a measurement date and time, a Brillouin frequency shift amount, a measurement temperature, an exposure time, a fictive temperature prediction equation, a fictive temperature, a correction value of the Brillouin frequency shift amount, and the like for each of the plurality of measurement positions set in the length direction of the optical fiber FUT. The data recorder 15 may record spectrum data for each of the plurality of measurement positions set in the length direction of the optical fiber FUT.

The spectrum data for each of the measurement positions described above is acquired by the spectrum data acquirer 11. The Brillouin frequency shift amount described above is obtained by the spectrum data analyzer 12. The fictive temperature prediction equation, the fictive temperature, and the correction value of the Brillouin frequency shift amount described above are obtained by the corrector 13. The measurement temperature is obtained by the temperature calculator 14.

The temperature measuring device 10 may include a display for displaying various types of data obtained by the temperature measuring device 10 and various types of data recorded in the data recorder 15. For example, a liquid crystal display, an organic electro luminescence (EL) display device, or the like can be used as the display. In addition, the temperature measuring device 10 may also include an output for outputting various types of data obtained by the temperature measuring device 10 and various types of data recorded in the data recorder 15.

The temperature measuring device 10 can be realized by a computer such as a personal computer or workstation. When the temperature measuring device 10 is realized by a computer, functions of each part provided in the temperature measuring device 10 are realized by a central processing unit (CPU) provided in the computer executing a program for realizing these functions. That is, the functions of each part provided in the temperature measuring device 10 are realized by software and hardware resources in cooperation. Note that the temperature measuring device 10 may be realized by using hardware such as a field-programmable gate array (FPGA), a large-scale integration (LSI), an application specific integrated circuit (ASIC), and the like.

<Fictive Temperature Prediction Equation>

Figure 2A:
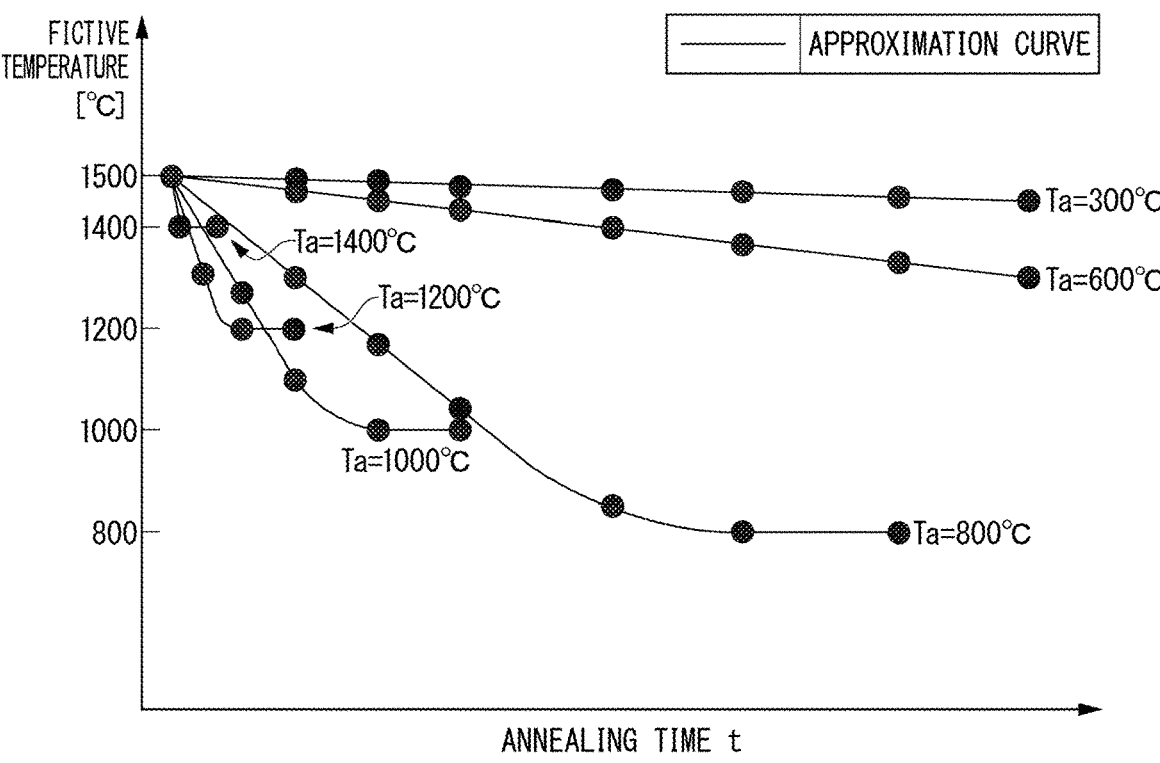
FIGS. 2A and 2B are diagrams which show a time-dependent change in a fictive temperature when annealing processing is performed on an optical fiber.
Figure 2B:
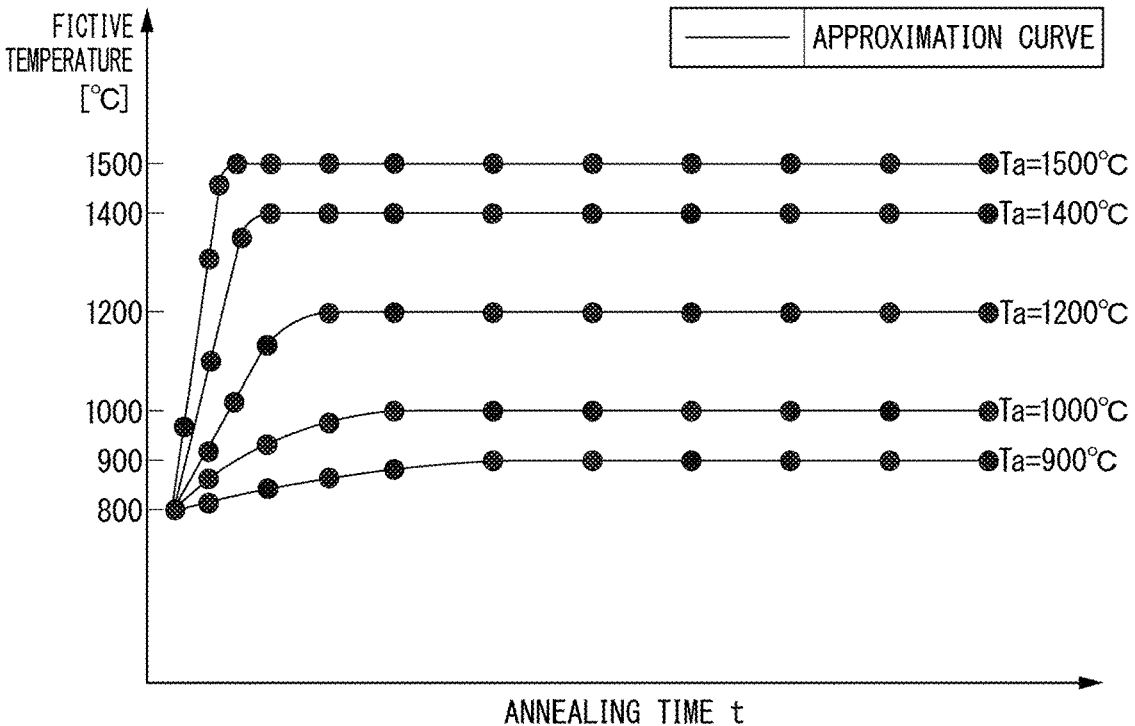

FIGS. 2A and 2B are diagrams which show a time-dependent change in a fictive temperature when annealing processing is performed on an optical fiber. FIG. 2A shows a case in which an annealing temperature is lower than a fictive temperature in the initial state of the optical fiber, and FIG. 2B shows a case in which the annealing temperature is higher than the fictive temperature in an initial state of the optical fiber. In the graphs shown in FIGS. 2A and 2B, the horizontal axis represents an annealing time (a time for heat treatment performed on the optical fiber), and the vertical axis represents the fictive temperature of the optical fiber.

In FIG. 2A, the fictive temperature in the initial state of the optical fiber is 1500° C., and time-dependent changes in the fictive temperature in cases in which the annealing temperature Ta is set to 1400° C., 1200° C., 1000° C., 800° C., 600° C., and 300° C. are exemplified. In FIG. 2B, the fictive temperature in the initial state of the optical fiber is 800° C., and the time-dependent changes in the fictive temperature in cases in which the annealing temperature Ta is set to 1500° C., 1400° C., 1200° C., 1000° C., and 900° C. are exemplified.

As shown in FIGS. 2A and 2B, the fictive temperature changes steeply as the annealing temperature Ta increases, but the change becomes gentler as the annealing temperature Ta decreases. In addition, a time required to reach the annealing temperature Ta becomes shorter as the annealing temperature Ta increases, but it becomes longer as the annealing temperature Ta decreases. That is, a time required for the structural relaxation to converge becomes shorter as the annealing temperature Ta increases, and the time required for the structural relaxation to converge becomes longer as the annealing temperature Ta decreases.

When it is assumed that the annealing time is t and the time-dependent change in the fictive temperature is $T_f(t)$, the time-dependent change $T_f(t)$ of the fictive temperature can be represented by the following Equation (2).

[Math. 2]

$$T_f(t) = \alpha \cdot \exp\left(\frac{t}{\tau_1}\right) + \beta \cdot \exp\left(\frac{t}{\tau_2}\right) + T_{f0} \tag{2}$$

$\tau_1$ and $\tau_2$ in Equation (2) described above are relaxation times, $\alpha$ and $\beta$ are coefficients, and $T_{f0}$ is a fictive temperature in the initial state of the optical fiber. Note that the initial state of the optical fiber is a state thereof before the annealing processing is performed on the optical fiber. The fictive temperature $T_{f0}$ in the initial state of the optical fiber is measured by using a method of measuring changes in the density or the refractive index of the optical fiber, or the spectroscopic methods such as infrared spectroscopy or Raman spectroscopy. The relaxation times $\tau_1$ and $\tau_2$ and the coefficients $\alpha$ and $\beta$ are obtained based on an equation of an approximation curve obtained by performing curve fitting on a result, obtained by performing the annealing processing on the optical fiber.

Here, as shown in FIGS. 2A and 2B, the time-dependent change in the fictive temperature when the annealing processing is performed on the optical fiber varies depending on the fictive temperature $T_{f0}$ and the annealing temperature Ta in the initial state of the optical fiber. For this reason, the time-dependent change $T_f(t)$ of the fictive temperature shown in Equation (2) described above is obtained for each combination of the fictive temperature $T_{f0}$ and the annealing temperature Ta in the initial state of the optical fiber.

For example, the relaxation times $\tau_1$ and $\tau_2$ in the case shown in FIG. 2A are set to $\tau_{11\_Ta}$ and $\tau_{12\_Ta}$, and the coefficients $\alpha$ and $\beta$ are set to $\alpha 1_{Ta}$ and $\beta 1_{Ta}$. In addition, the relaxation times $\tau_1$ and $\tau_2$ in the case shown in FIG. 2B are set to $\tau_{21\_Ta}$ and $\tau_{22\_Ta}$, and the coefficients $\alpha$ and $\beta$ are set to $\alpha 2_{Ta}$ and $\beta 2_{Ta}$. A subscript Ta of the relaxation times $\tau_{11\_Ta}$, $\tau_{12\_Ta}$, $\tau_{21\_Ta}$, and $\tau_{22\_Ta}$ and the coefficients $\alpha 1_{Ta}$, $\beta 1_{Ta}$, $\alpha 2_{Ta}$, and $\beta 2_{Ta}$ means an annealing temperature. The time-dependent change $T_f(t)$ of the fictive temperature for each annealing temperature Ta shown in FIG. 2A is represented by the following Equation (3), and the time-dependent change $T_f(t)$ of the fictive temperature for each annealing temperature Ta shown in FIG. 2B is represented by the following Equation (4).

[Math. 3]

$$T_f(t) = \alpha 1_{Ta} \cdot \exp\left(\frac{t}{\tau_{11\_Ta}}\right) + \beta 1_{Ta} \cdot \exp\left(\frac{t}{\tau_{12\_Ta}}\right) + T_{f0} \quad (3)$$

[Math. 4]

$$T_f(t) = \alpha 2_{Ta} \cdot \exp\left(\frac{t}{\tau_{21\_Ta}}\right) + \beta 2_{Ta} \cdot \exp\left(\frac{t}{\tau_{22\_Ta}}\right) + T_{f0} \quad (4)$$

Figure 3:
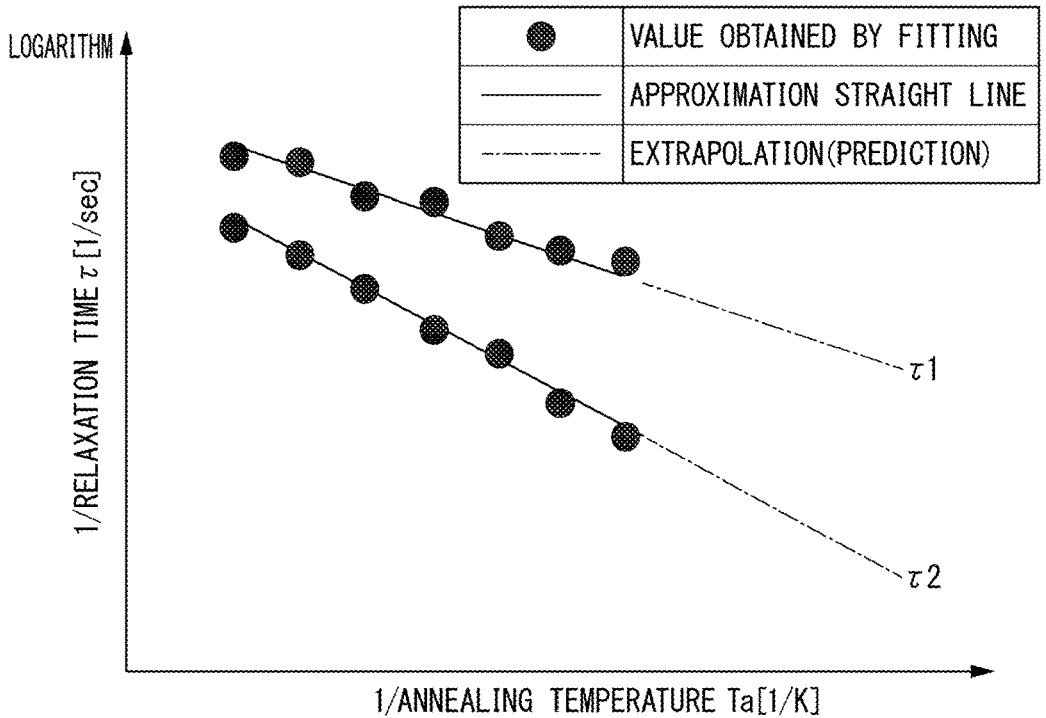
FIG. 3 is a diagram which shows a relationship between an annealing temperature and a relaxation time when annealing processing is performed on an optical fiber.

FIG. 3 is a diagram which shows a relationship between the annealing temperature and the relaxation time when the annealing processing is performed on the optical fiber. A graph shown in FIG. 3 is a so-called Arrhenius plot in which the horizontal axis represents a reciprocal of the annealing temperature Ta and the vertical axis represents a logarithm of the reciprocal of the relaxation time. The graph shown in FIG. 3 is a graph in which the relaxation times $\tau_1$ and $\tau_2$ obtained by performing the annealing processing shown in FIG. 2A are plotted. The annealing processing shown in FIG. 2A is annealing processing performed when the fictive temperature in the initial state of the optical fiber is 1500° C., and the annealing temperature Ta is set to 1400° C., 1200° C., 1000° C., 800° C., 600° C., and 300° C.

As shown in FIG. 3, it can be understood that the logarithms of the reciprocals of the relaxation times $\tau_1$ and $\tau_2$ and the reciprocal of the annealing temperature Ta are in a negatively proportional relationship. An approximation straight line representing the relationship between the logarithm of the reciprocal of the relaxation time $\tau_1$ and the reciprocal of the annealing temperature Ta is represented by the following Equation (5), and an approximation straight line representing the relationship between the logarithm of the reciprocal of the relaxation time $\tau_2$ and the reciprocal of the annealing temperature Ta is represented by the following Equation (6). In the following Equations (5) and (6), j1 and j2 are coefficients, m1 and m2 are constants, and Ta is the annealing temperature.

[Math. 5]

$$\frac{1}{\tau_1} = j1 \cdot \frac{1}{T_a} + m1 \quad (5)$$

-continued

[Math. 6]

$$\frac{1}{\tau_2} = j2 \cdot \frac{1}{T_a} + m2 \quad (6)$$

From Equations (5) and (6), it is possible to obtain the relaxation times $\tau_1$ and $\tau_2$ at an annealing temperature at which the annealing processing is not actually performed. For example, a case in which the annealing processing is performed by setting the annealing temperature Ta between 1000° C. and 1500° C. in increments of 100° C. will be considered. In this case, it is possible to obtain the relaxation times $\tau_1$ and $\tau_2$ at a temperature between the increments (for example, 1050° C.), and to obtain the relaxation times $\tau_1$ and $\tau_2$ at temperatures outside the temperature range (for example, 800° C.).

Equations (2) to (4) described above are equations that show the time-dependent change $T_f(t)$ of the fictive temperature, but the time-dependent change in the fictive temperature of the optical fiber can be predicted when these equations are used. For this reason, Equations (2) to (4) can also be referred to as fictive temperature prediction equations. It is desirable to prepare a fictive temperature prediction equation over a wide temperature range to extend a range of temperatures that can be measured by the temperature measuring device 10. In addition, it is desirable to prepare a fictive temperature prediction equation with fine temperature increments to improve an accuracy in temperature measurement by the temperature measuring device 10. Parameters used in the fictive temperature prediction equation (relaxation times $\tau_{11\_Ta}$, $\tau_{12\_Ta}$, $\tau_{21\_Ta}$, and $\tau_{22\_Ta}$ and coefficients $\alpha 1_{Ta}$, $\beta 1_{Ta}$, $\alpha 2_{Ta}$, and $\beta 2_{Ta}$) are recorded in, for example, the data recorder 15 of the temperature measuring device 10.

Figure 4:
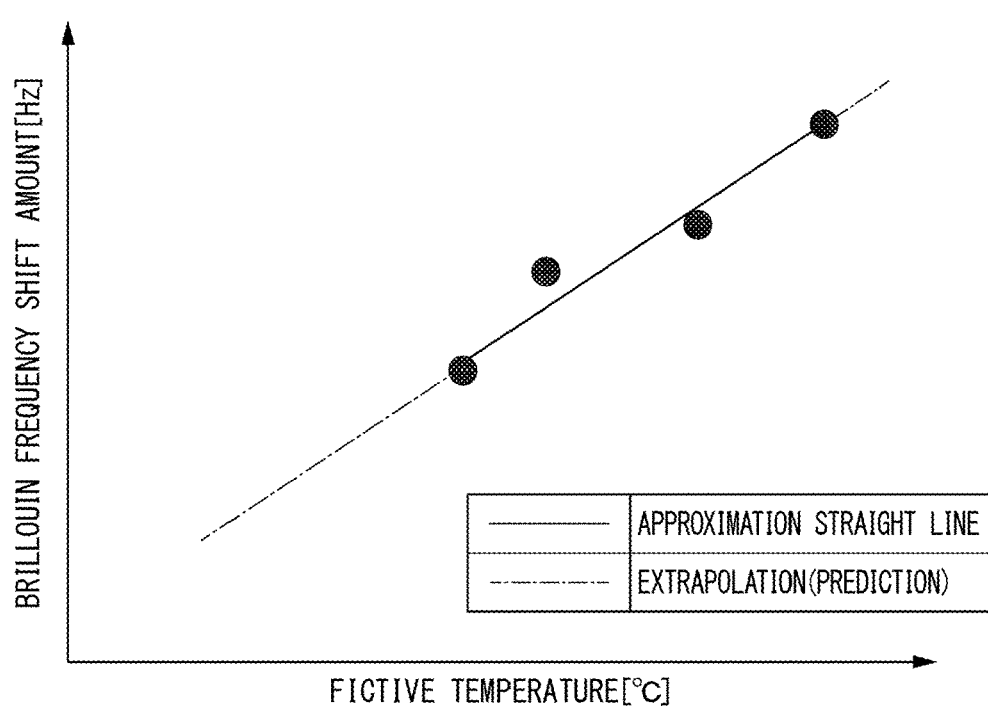
FIG. 4 is a diagram which shows a relationship between a fictive temperature and a Brillouin frequency shift amount.

FIG. 4 is a diagram which shows a relationship between the fictive temperature and the Brillouin frequency shift amount. The relationship between the fictive temperature and the Brillouin frequency shift amount is obtained by measuring a Brillouin frequency shift of optical fibers with known fictive temperatures that are different under a room temperature environment. As shown in FIG. 4, it can be understood that the fictive temperature and the Brillouin frequency shift amount are in a positively proportional relationship. An approximation straight line representing the relationship between a fictive temperature $T_f$ and a Brillouin frequency shift amount $\nu$ is represented by the following Equation (7). Note that k in the following Equation (7) is a coefficient, and n is a constant.

[Math 7]

$$\nu = k \cdot T_f + n \quad (7)$$

The time-dependent change $\nu(t)$ of the Brillouin frequency shift amount is represented by the following Equation (8) using the time-dependent change $T_f(t)$ of the fictive temperature based on Equation (7) described above and Equation (2) described above.

[Math 8]

$$\nu(t) = k \cdot T_f(t) + n \quad (8)$$

The amount of change $\Delta\nu$ in the Brillouin frequency shift amount after the annealing time t has elapsed since a start of the annealing processing for the optical fiber is represented by the following Equation (9). Note that $T_{f0}$ in the following Equation (9) is a fictive temperature when the annealing processing is started.

[Math 9]

$$\Delta v(t) = k \cdot (T_f(t) - T_{f0}) \tag{9}$$

Here, when it is considered that the annealing processing for the optical fiber is performed by heat of the measurement object, Equation (9) described above can be said to be an equation showing the amount of change $\Delta v$ in the Brillouin frequency shift amount when a time t has elapsed since the optical fiber FUT is laid in the measurement object. For this reason, the amount of change $\Delta v$ in the Brillouin frequency shift amount of the optical fiber FUT can be predicted based on Equation (9) described above. In the present embodiment, the corrector 13 predicts the amount of change $\Delta v$ in the Brillouin frequency shift amount using Equation (9) described above, and corrects the Brillouin frequency shift amount $v$ obtained by the spectrum data analyzer 12 using the predicted amount of change $\Delta v$ in the Brillouin frequency shift amount.

<Temperature Measuring Method>

Figure 5:
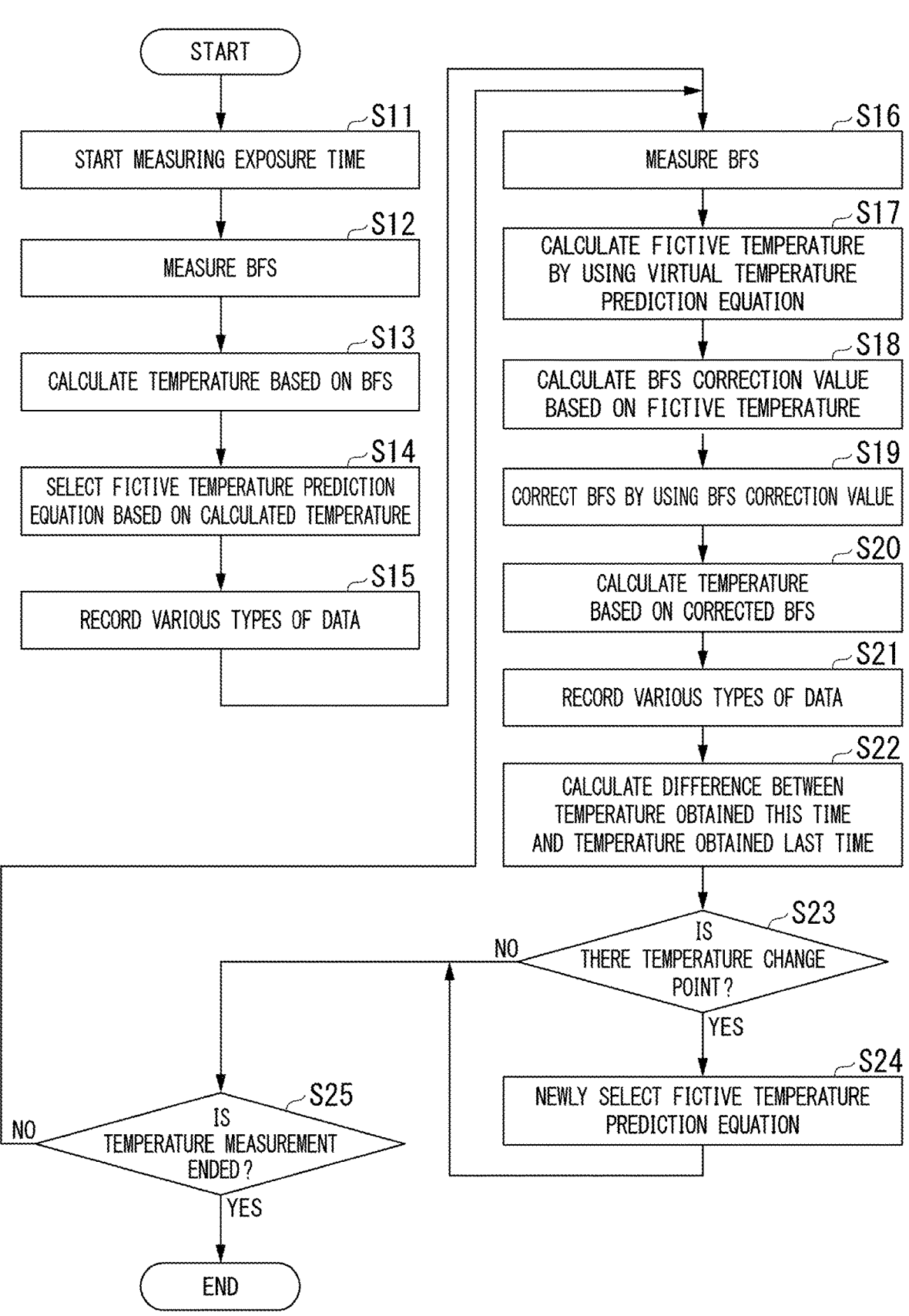
FIG. 5 is a flowchart which shows a temperature measuring method according to the first embodiment of the present invention.

FIG. 5 is a flowchart which shows a temperature measuring method according to the first embodiment of the invention. The flowchart shown in FIG. 5 is started by, for example, a user instructing the optical fiber sensor system 1 to start measurement after the optical fiber FUT is laid in the measurement object to construct the optical fiber sensor system 1.

Before the temperature measurement is started by the optical fiber sensor system 1, the fictive temperature of the optical fiber FUT is measured. In addition, the optical fiber FUT whose fictive temperature has been measured needs not to be exposed to a high-temperature environment before the temperature measurement is started by the optical fiber sensor system 1. This is because the structural relaxation of the optical fiber FUT progresses in the high-temperature environment and the fictive temperature changes, although this is not considered to be a big problem because a change in the fictive temperature of the optical fiber FUT is small when an exposure temperature is several hundred degrees Celsius or less. It is desirable that the optical fiber FUT whose fictive temperature has been measured be left as it is or stored in, for example, a room temperature environment.

When processing of the flowchart shown in FIG. 5 is started, the temperature measuring device 10 first starts measuring the exposure time (step S11). This is because an elapsed time from the start of a temperature measurement is required to record the thermal history of the optical fiber FUT.

Next, the temperature measuring device 10 measures the Brillouin frequency shift amount $v$ at each of the plurality of measurement positions set in the length direction of the optical fiber FUT (step S12). Specifically, when the temperature measurement is started by the optical fiber sensor system 1, light is emitted from the optical fiber sensor main body 20 to the optical fiber FUT, and Brillouin scattered light generated inside the optical fiber FUT is detected by the optical fiber sensor main body 20. As a result, the optical fiber sensor main body 20 outputs spectrum data indicating a spectrum of the Brillouin scattered light generated at each of the measurement positions.

The spectrum data acquirer 11 of the temperature measuring device 10 acquires the spectrum data output from the optical fiber sensor main body 20. The spectrum data analyzer 12 of the temperature measuring device 10 analyzes the spectrum data acquired by the spectrum data acquirer 11 and obtains the Brillouin frequency shift amount $v$. In this manner, the Brillouin frequency shift amount $v$ at each of the plurality of measurement positions set in the length direction of the optical fiber FUT is measured.

Next, the temperature measuring device 10 calculates the temperature at each of the measurement positions based on the Brillouin frequency shift amount $v$ at each of the measurement positions (step S13). Specifically, the temperature calculator 14 of the temperature measuring device 10 obtains the temperature T at each of the measurement positions based on the Brillouin frequency shift amount $v$ at each of the measurement positions using a conversion equation shown in Equation (1) described above. Note that, here, the Brillouin frequency shift amount $v$ is not corrected by the corrector 13 because a time from the start of measurement is short and it is considered that the fictive temperature of the optical fiber FUT has not changed.

Subsequently, the temperature measuring device 10 selects a fictive temperature prediction equation at each of the measurement positions on the basis of the calculated temperature at each of the measurement positions (step S14). This selection is made by the corrector 13 of the temperature measuring device 10.

For example, as shown in FIG. 2A, a case in which the fictive temperature of the optical fiber FUT is 1500° C. and the temperature at each of the measurement positions is lower than 1500° C. is considered. In this case, when the temperature at a certain measurement position is 800° C., as a fictive temperature prediction equation at a corresponding position, an equation in which the annealing temperature Ta is "800" in Equation (3) described above (an equation in which relaxation times $\tau_{11\_800}$ and $\tau_{12\_800}$, and coefficients $\alpha 1_{800}$ and $\beta 1_{800}$ are used) is selected. In addition, when the temperature at another measurement position is 700° C., as a fictive temperature prediction equation at a corresponding position, an equation in which the annealing temperature Ta is "700" in Equation (3) described above (an equation in which relaxation times $\tau_{11\_700}$ and $\tau_{12\_700}$, and coefficients $\alpha 1_{700}$ and $\beta 1_{700}$ are used) is selected.

When the processing described above ends, the temperature measuring device 10 causes the data recorder 15 to record various types of data (step S15). Specifically, the temperature measuring device 10 causes it to record the date and time of measurement, the Brillouin frequency shift amount, the measurement temperature, the exposure time, the fictive temperature prediction equation, the fictive temperature, and the like for each of the measurement positions. Additionally, the temperature measuring device 10 may cause it to record spectrum data at each of the measurement positions.

Next, the temperature measuring device 10 measures the Brillouin frequency shift amount $v$ at each of a plurality of measurement positions set in the length direction of the optical fiber FUT (step S16: an acquisition step, an analysis step). Specifically, the spectrum data analyzer 12 of the temperature measuring device 10 performs the same analysis as the analysis performed in step S12 on the spectrum data acquired by the spectrum data acquirer 11 to obtain the Brillouin frequency shift amount $v$.

Next, the temperature measuring device 10 calculates the fictive temperature at each of the measurement positions by using the fictive temperature prediction equation selected at each of the measurement positions (step S17). Specifically, the corrector 13 of the temperature measuring device 10 reads the fictive temperature prediction equation for each of the measurement positions from the data recorder 15, and substitutes the exposure time into the read fictive temperature prediction equation to calculate the fictive temperature at each of the measurement positions. For example, the corrector 13 calculates the fictive temperature ($T_f(t)$) at each of the measurement positions by substituting the exposure time measured by the temperature measuring device 10 into the annealing time t in Equation (3) described above.

Subsequently, the temperature measuring device 10 calculates the correction value of the Brillouin frequency shift amount at each of the measurement positions based on the fictive temperature at each of the measurement positions (step S18: correction step). That is, the temperature measuring device 10 predicts the amount of change in the Brillouin frequency shift amount at each of the measurement positions. Specifically, the corrector 13 of the temperature measuring device 10 obtains an amount of change $\Delta v(t)$ in the Brillouin frequency shift amount using Equation (9) described above. Here, since the amount of change $\Delta v$ (t) in the Brillouin frequency shift amount is the amount of change (drift) in the Brillouin frequency shift amount in a high-temperature environment, the amount of change $\Delta v$ (t) can be used as the correction value. Although $T_{f0}$ in Equation (9) described above is the fictive temperature at the time of a start of the annealing processing, the fictive temperature of the optical fiber FUT measured before starting the temperature measurement is herein used.

Subsequently, the temperature measuring device 10 uses the correction value ($\Delta v(t)$) of the Brillouin frequency shift amount at each of the measurement positions to correct the Brillouin frequency shift amount $v$ (the Brillouin frequency shift amount $v$ measured in step S16) at each of the measurement positions (step 19: correction step). Specifically, the corrector 13 of the temperature measuring device 10 subtracts the correction value ($\Delta v(t)$) from the Brillouin frequency shift amount $v$ when the correction value ($\Delta v(t)$) is positive. On the other hand, the corrector 13 adds the correction value ($\Delta v(t)$) to the Brillouin frequency shift amount $v$ when the correction value ($\Delta v(t)$) is negative.

Subsequently, the temperature measuring device 10 calculates the temperature at each of the measurement positions based on the corrected Brillouin frequency shift amount $v$ at each of the measurement positions (step S20: temperature calculation step). Specifically, the temperature calculator 14 of the temperature measuring device 10 obtains the temperature T at each of the measurement positions based on the corrected Brillouin frequency shift amount $v$ at each of the measurement positions using the conversion equation shown in Equation (1) described above.

When the processing described above ends, the temperature measuring device 10 causes the data recorder 15 to record various types of data (step S21). Specifically, the temperature measuring device 10 causes it to record the date and time of measurement, the Brillouin frequency shift amount, the measurement temperature, the exposure time, the fictive temperature prediction equation, the fictive temperature, and the like for each of the measurement positions in the same manner as in step S15. In addition, the temperature measuring device 10 causes it to record correction values of the Brillouin frequency shift amount for each of the measurement positions. Furthermore, the temperature measuring device 10 may also cause it to record spectrum data at each of the measurement positions.

Next, the corrector 13 of the temperature measuring device 10 uses the data recorded in the data recorder 15 to calculate a difference between a temperature newly obtained this time and a temperature obtained last time at each of the measurement positions (step S22). Then, the corrector 13 of the temperature measuring device 10 determines whether there is a measurement position (hereinafter referred to as "temperature change point") at which the difference in temperature is greater than a predetermined threshold value (step S23).

When it is determined that there is a temperature change point (when a result of the determination in step S23 is "YES"), the corrector 13 of the temperature measuring device 10 newly selects the fictive temperature prediction equation at each temperature change point (step S24). Specifically, the corrector 13 confirms a magnitude relationship between the fictive temperature calculated in step S17 and the temperature newly obtained this time in step S20 at each temperature change point, and selects the fictive temperature prediction equation at each temperature change point on the basis of this magnitude relationship.

For example, it is assumed that the fictive temperature is higher than the newly obtained temperature this time at a certain temperature change point, and the newly obtained temperature this time is 500° C. At this time, as the fictive temperature prediction equation at the temperature change point, an equation in which the annealing temperature Ta is "500" in Equation (3) described above (an equation in which relaxation times $\tau_{11\_500}$ and $\tau_{12\_500}$, coefficients $\alpha 1_{500}$ and $\beta 1_{500}$ are used) is newly selected.

On the other hand, for example, it is assumed that the fictive temperature is lower than the newly obtained temperature this time at a certain temperature change point, and the newly obtained temperature this time is 500° C. At this time, as the fictive temperature prediction equation at the temperature change point, an equation in which the annealing temperature Ta is "500" in Equation (4) described above (an equation in which relaxation times $\tau_{21\_500}$ and $\tau_{22\_500}$, coefficients $\alpha 2_{500}$ and $\beta 2_{500}$ are used) is newly selected.

Here, when the fictive temperature prediction equation is newly selected, the corrector 13 of the temperature measuring device 10 adjusts the newly selected equation such that a current fictive temperature obtained by the newly selected equation is the fictive temperature calculated in step S17. Specifically, the corrector 13 changes t in the selected equation to (t−tc+tα). tc is a current time based on a time (t=0) at which exposure time measurement is started in step S11. In the newly selected fictive temperature prediction equation, tα is a time required for the fictive temperature to reach the fictive temperature calculated in step S17 from the fictive temperature measured before a temperature measurement is started (for example, 1500° C.). Note that tα is obtained by substituting the fictive temperature measured before a temperature measurement is started into $t_{f0}$ and substituting the fictive temperature calculated in step S17 into $T_f(t)$ in the newly selected equation.

When the corrector 13 has determined that there are no temperature change points (when a result of the determination in step S23 is "NO"), or when it has ended the processing of step S24, the temperature measuring device 10 determines whether to end the temperature measurement (step S25). For example, the temperature measuring device 10 determines not to end the temperature measurement when the user does not instruct the optical fiber sensor system 1 to end the measurement.

When the temperature measuring device 10 determines not to end the temperature measurement (when a result of the determination in step S25 is "NO"), the processing of steps S16 to S25 is repeated. On the other hand, when the temperature measuring device 10 determines to end the temperature measurement (when a result of the determination in step S25 is "YES"), a series of processing shown in FIG. 5 ends.

As described above, in the present embodiment, first, the spectrum data acquirer 11 acquires spectrum data indicating the spectrum of Brillouin scattered light generated by causing light to be incident on the optical fiber FUT. Next, the spectrum data analyzer 12 analyzes the spectrum data to obtain the Brillouin frequency shift amount v. Next, the corrector 13 predicts the amount of change in the Brillouin frequency shift amount due to the structural relaxation of the optical fiber FUT based on the thermal history of the optical fiber FUT, and corrects the obtained Brillouin frequency shift amount using the predicted amount of change. Then, the temperature calculator 14 obtains the temperature of the optical fiber FUT on the basis of the corrected Brillouin frequency shift amount. As a result, it is possible to perform a temperature measurement in a high-temperature environment with high accuracy over a long period of time.

Second Embodiment

Figure 6:
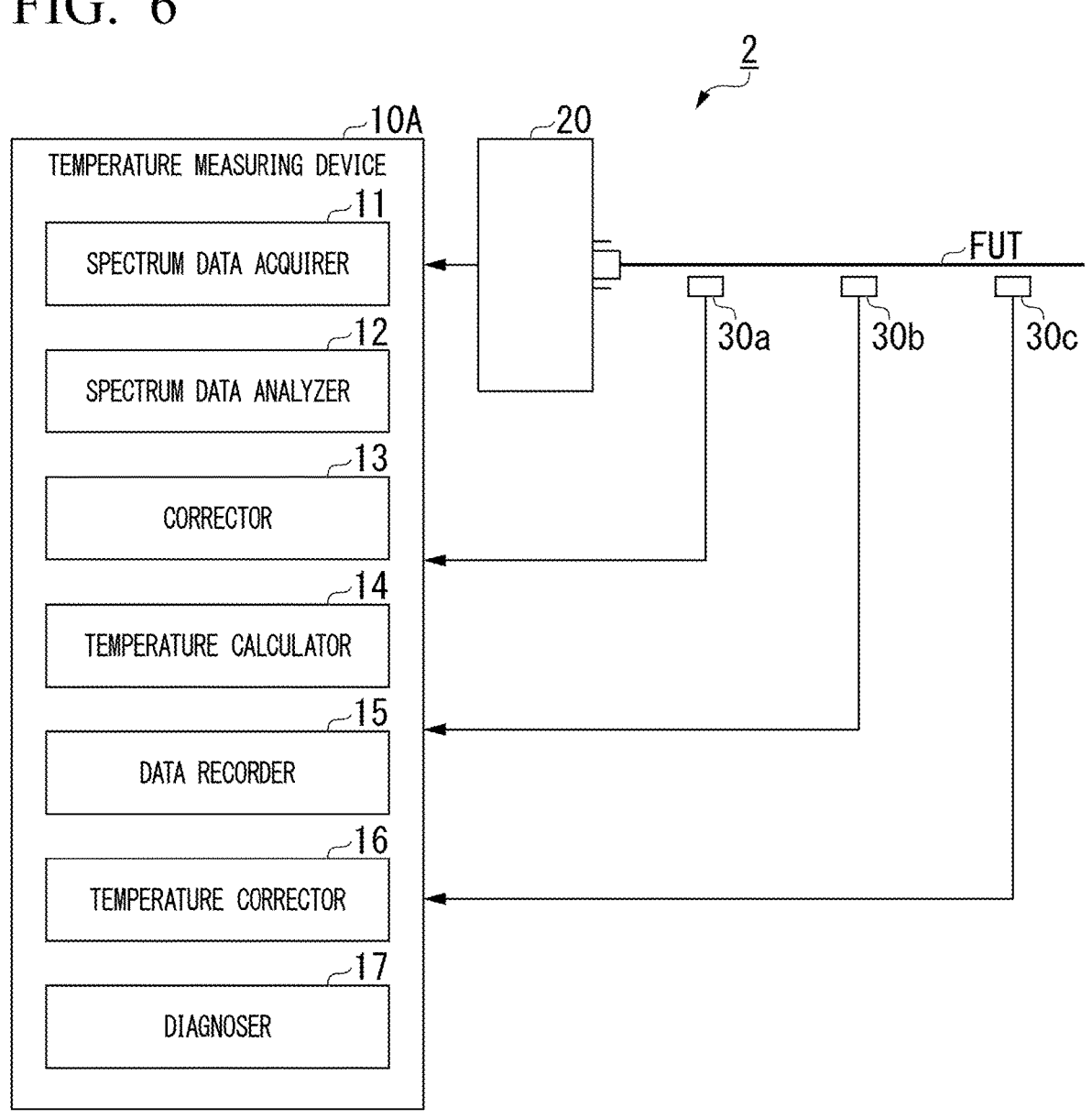
FIG. 6 is a block diagram which shows a configuration of a main part of a temperature measuring device according to a second embodiment of the present invention.

FIG. 6 is a block diagram which shows a configuration of a main part of a temperature measuring device according to a second embodiment of the present invention. An optical fiber sensor system 2 shown in FIG. 6 includes a temperature measuring device 10A, an optical fiber sensor main body 20, and thermocouples 30a, 30b, and 30c (temperature measuring elements). Such an optical fiber sensor system 2 corrects a result of the measurement of the temperature measuring device 10A using results of the measurement of the thermocouples 30a, 30b, and 30c, or diagnoses a soundness of the temperature measuring device 10A or the thermocouples 30a, 30b, and 30c.

The thermocouples 30a, 30b, and 30c are arranged at any three of the measurement positions set in the length direction of the optical fiber FUT, and measure the temperature of the optical fiber FUT at the measurement positions. The thermocouples 30a, 30b, and 30c may be installed to measure the temperature of the optical fiber FUT itself, or may be installed to measure a temperature of the vicinity of the optical fiber FUT (for example, a temperature of a measurement object). In the present embodiment, an example in which the three thermocouples 30a, 30b, and 30c are installed will be described, but the number of thermocouples may be one, two, or four or more.

The thermocouples 30a, 30b, and 30c output results of the temperature measurement to the temperature measuring device 10A. The thermocouples 30a, 30b, and 30c may directly or indirectly output the results of the temperature measurement to the temperature measuring device 10A. For example, the thermocouples 30a, 30b, and 30c may include transmitters for wired or wireless transmission of the results of the temperature measurement. Alternatively, the thermocouples 30a, 30b, and 30c may output the results of the temperature measurement to transmitters each separately provided to transmit the results of the temperature measurement by wire or wirelessly.

The temperature measuring device 10A of the present embodiment has a configuration in which a temperature corrector 16 and a diagnoser 17 are added to the temperature measuring device 10 shown in FIG. 1. The temperature corrector 16 corrects the temperature obtained by the temperature calculator 14 using the temperatures measured by the thermocouples 30a, 30b, and 30c. The diagnoser 17 diagnoses the soundness of the temperature measuring device 10A or the soundness of the thermocouples 30a, 30b, and 30c by comparing the temperature obtained by the temperature calculator 14 and the temperatures measured by the thermocouples 30a, 30b, and 30c.

Specifically, the diagnoser 17 diagnoses that there is an abnormality in the temperature measuring device when a temperature difference between the temperature obtained by the temperature calculator 14 and the temperatures measured by the thermocouples 30a, 30b, and 30c is greater than a predetermined value at all or most of locations where the thermocouples 30a, 30b, and 30c are installed. On the other hand, the diagnoser 17 diagnoses that there is an abnormality in the thermocouples 30a, 30b, and 30c when the temperature difference is greater than a predetermined value at only one location or several locations where the thermocouples 30a, 30b, and 30c are installed.

FIGS. 7A to 7D are diagrams for describing processing performed by the temperature measuring device according to the second embodiment of the present invention. FIG. 7A is a diagram for describing processing performed by the temperature corrector 16 of the temperature measuring device 10A, and FIGS. 7B to 7D are diagrams for describing processing performed by the diagnoser 17 of the temperature measuring device 10A. In graphs shown in FIGS. 7A to 7D, the horizontal axis represents a distance (a measurement position) in the length direction of the optical fiber FUT, and the vertical axis represents a temperature. A temperature T1 in FIGS. 7A to 7D indicates a temperature measured by the temperature measuring device 10A, and temperatures T11, T12, and T13 indicate the temperatures measured by the thermocouples 30a, 30b, and 30c, respectively.

The temperature corrector 16 compares the temperatures measured by the thermocouples 30a, 30b, and 30c with the temperature obtained by the temperature calculator 14 at each of the measurement positions in which the thermocouples 30a, 30b, and 30c are installed. Then, the temperature corrector 16 corrects the temperature obtained by the temperature calculator 14 using the temperatures measured by the thermocouples 30a, 30b, and 30c. The temperature corrector 16 corrects, for example, all the temperatures obtained by the temperature calculator 14 using an average value of the temperature differences of the compared temperatures, as shown in FIG. 7A. A temperature T2 in FIG. 7A is a temperature after correction. Alternatively, the temperature corrector 16 may determine a correction value for each of the temperatures measured by the thermocouples 30a, 30b, and 30c.

The diagnoser 17 compares the temperatures measured by the thermocouples 30a, 30b, and 30c with the temperature obtained by the temperature calculator 14 at each of the measurement positions in which the thermocouples 30a, 30b, and 30c are installed. Then, as shown in FIGS. 7B and 7C, when the temperature difference between the temperature obtained by the temperature calculator 14 and the temperatures measured by the thermocouples 30a, 30b, and 30c is greater than a predetermined value at all or most of the measurement positions described above, it is diagnosed that there is an abnormality in the temperature measuring device 10A. Note that "most" of the measurement positions described above refers to measurement positions excluding one location or several locations of the measurement positions described above. When the diagnoser 17 diagnoses that there is an abnormality in the temperature measuring device 10A, it is desirable to stop the temperature measurement.

On the other hand, as shown in FIG. 7D, when the temperature difference between the temperature obtained by the temperature calculator 14 and the temperatures measured by the thermocouples 30a, 30b, and 30c is greater than a predetermined value at only one location or several locations of the measurement positions described above, it is diagnosed that there is an abnormality in the thermocouple at corresponding measurement positions. In an example shown in FIG. 7D, it is diagnosed that there is an abnormality in the thermocouple 30b. When the diagnoser 17 has diagnosed that there is an abnormality in a thermocouple, a result of measurement by the thermocouple that is diagnosed to have an abnormality is, for example, excluded from the temperature correction performed by the temperature corrector 16.

An operation of the temperature measuring device 10A of the present embodiment is basically the same as an operation of the temperature measuring device 10 shown in FIG. 1 except for the temperature correction performed by the temperature corrector 16 and the diagnosis performed by the diagnoser 17. That is, the operation of the temperature measuring device 10A of the present embodiment is basically performed according to the flowchart shown in FIG. 5. For this reason, detailed description will be omitted herein.

As described above, also in the present embodiment, first, the spectrum data acquirer 11 acquires spectrum data indicating a spectrum of the Brillouin scattered light generated by causing light to be incident on the optical fiber FUT. Next, the spectrum data analyzer 12 analyzes the spectrum data to obtain the Brillouin frequency shift amount v. Next, the corrector 13 predicts the amount of change in the Brillouin frequency shift amount due to the structural relaxation of the optical fiber FUT based on the thermal history of the optical fiber FUT, and corrects the obtained Brillouin frequency shift amount using the predicted amount of change. Then, the temperature calculator 14 obtains the temperature of the optical fiber FUT on the basis of the corrected Brillouin frequency shift amount. As a result, it is possible to perform a temperature measurement in a high-temperature environment with high accuracy over a long period of time.

Also, in the present embodiment, the temperature corrector 16 corrects the temperature obtained by the temperature calculator 14 using the temperatures measured by the thermocouples 30a, 30b, and 30c. For this reason, an error of the temperature obtained by the temperature calculator 14 can be set to about measurement errors of the thermocouples 30a, 30b, and 30c. In addition, in the present embodiment, the diagnoser 17 compares the temperature obtained by the temperature calculator 14 with the temperatures measured by the thermocouples 30a, 30b, and 30c to diagnose the soundness of the temperature measuring device 10A or the soundness of the thermocouples 30a, 30b, and 30c. As a result, when there is a discrepancy between the temperature measured by the temperature measuring device 10A and the temperatures measured by the thermocouples 30a, 30b, and 30c, it can be clarified whether the cause is in the temperature measuring device 10A, or in the thermocouples 30a, 30b, and 30c.

Although the temperature measuring device and temperature measuring method according to the embodiments of the present invention have been described above, the present invention is not limited to the embodiments described above, and can be freely modified within the scope of the present invention. For example, in the first and second embodiments described above, the case in which the fictive temperature of the optical fiber FUT measured before the temperature measurement is started by the optical fiber sensor system 1 is 1500° C. has been described as an example. However, it is desirable to lower the fictive temperature of the optical fiber FUT as low as possible before the measurement is started. For example, it is desirable that the fictive temperature of the optical fiber FUT before the measurement is started be set to the same temperature as or approximately the same as the temperature of a measurement object that is an object whose temperature is measured. By setting the temperature in such a manner, errors of the temperature measurement by the temperature measuring devices 10 and 10A can be further reduced.

In addition, in the second embodiment described above, the example in which the thermocouples 30a, 30b, and 30c are arranged as temperature measuring elements for measuring the temperature at the measurement positions set in the length direction of the optical fiber FUT has been described. However, the temperature measuring elements are not limited to the thermocouples 30a, 30b, and 30c, and any temperature measuring element can be used in consideration of an installation status of the optical fiber FUT, a required accuracy in temperature, and the like.

[Supplementary Note]

A temperature measuring device according to a first aspect of the present invention may include: an acquirer (11) configured to acquire spectrum data that indicates a spectrum of Brillouin scattered light generated by causing light to be incident on an optical fiber (FUT); an analyzer (12) configured to analyze the spectrum data and to obtain a Brillouin frequency shift amount; a corrector (13) configured to predict an amount of change in the Brillouin frequency shift amount due to structural relaxation of the optical fiber from a thermal history of the optical fiber, and configured to correct the Brillouin frequency shift amount obtained by the analyzer using the predicted amount of change; and a temperature calculator (14) configured to obtain a temperature of the optical fiber on the basis of the Brillouin frequency shift amount corrected by the corrector.

According to a second aspect of the present invention, in the temperature measuring device according to the first aspect of the present invention, the corrector predicts the amount of change using a fictive temperature prediction equation that indicates a time-dependent change in a fictive temperature of the optical fiber represented using a fictive temperature in an initial state of the optical fiber and a relaxation time for each temperature.

According to a third aspect of the present invention, in the temperature measuring device according to the second aspect of the present invention, when a difference between a temperature newly obtained by the temperature calculator and a temperature previously obtained by the temperature calculator is greater than a predetermined threshold value, the corrector changes the fictive temperature prediction equation into a fictive temperature prediction equation represented using a relaxation time of the temperature newly obtained by the temperature calculator.

According to a fourth aspect of the present invention, in the temperature measuring device according to any one of the first to third aspects of the present invention, the fictive temperature of the optical fiber is set in advance to a temperature that is the same as or similar to a temperature of a measurement object that is an object whose temperature is measured.

According to a fifth aspect of the present invention, in the temperature measuring device according to any one of the first to fourth aspects of the present invention, the temperature measuring device may further include: at least one temperature measuring element (30a to 30c) configured to measure the temperature of the optical fiber.

According to a sixth aspect of the present invention, in the temperature measuring device according to the fifth aspect of the present invention, the temperature measuring device may further include: a temperature corrector (16) configured to correct the temperature obtained by the temperature calculator using the temperature measured by the temperature measuring element.

According to a seventh aspect of the present invention, in the temperature measuring device according to the fifth aspect of the present invention, temperature measuring device may further include: a diagnoser (17) configured to compare the temperature obtained by the temperature calculator with the temperature measured by the temperature measuring element and to diagnose a soundness of the temperature measuring device or a soundness of the temperature measuring element.

According to an eighth aspect of the present invention, in the temperature measuring device according to the seventh aspect of the present invention, the diagnoser diagnoses that there is an abnormality in the temperature measuring device when a temperature difference between the temperature obtained by the temperature calculator and the temperature measured by the temperature measuring element is greater than a predetermined value at all or most of locations where the temperature measuring elements are installed, and the diagnoser diagnoses that there is an abnormality in the temperature measuring elements when the temperature difference is greater than the predetermined value at only one location or several locations where the temperature measuring elements are installed.

According to a ninth aspect of the present invention, in the temperature measuring device according to any one of the first to eighth aspects of the present invention, the analyzer obtains the Brillouin frequency shift amount at each of a plurality of measurement positions set in a length direction of the optical fiber, the corrector predicts the amount of change at each of the measurement positions based on a thermal history at each of the measurement positions and corrects the Brillouin frequency shift amount at each of the measurement positions obtained by the analyzer using the amount of change at each of the predicted measurement positions, and the temperature calculator obtains a temperature at each of the measurement positions on the basis of the Brillouin frequency shift amount at each of the measurement positions corrected by the corrector.

According to a tenth aspect of the present invention, in the temperature measuring device according to any one of the first to ninth aspects of the present invention, the temperature measuring device may further include: a hardware processor configured to execute a program to implement functions of the acquirer, the analyzer, the corrector, and the temperature calculator.

A temperature measuring method according to an eleventh aspect of the present invention is performed by a temperature measuring device, and may include: an acquisition step (S16) of acquiring spectrum data that indicates a spectrum of Brillouin scattered light generated by causing light to be incident on an optical fiber (FUT); an analysis step (S16) of analyzing the spectrum data and obtaining a Brillouin frequency shift amount; a correction step (S18, S19) of predicting an amount of change in the Brillouin frequency shift amount due to structural relaxation of the optical fiber (FUT) from a thermal history of the optical fiber (FUT), and correcting the Brillouin frequency shift amount obtained in the analysis step using the predicted amount of change; and a temperature calculation step (S20) of obtaining a temperature of the optical fiber (FUT) on the basis of the Brillouin frequency shift amount corrected in the correction step.

According to a twelfth aspect of the present invention, in the temperature measuring method according to the eleventh aspect of the present invention, the temperature measuring method may further include: in the correction step, predicting the amount of change using a fictive temperature prediction equation that indicates a time-dependent change in a fictive temperature of the optical fiber represented using a fictive temperature in an initial state of the optical fiber and a relaxation time for each temperature.

According to a thirteenth aspect of the present invention, in the temperature measuring method according to the twelfth aspect of the present invention, the temperature measuring method may further include: when a difference between a temperature newly obtained in the temperature calculation step and a temperature previously obtained in the temperature calculation step is greater than a predetermined threshold value, in the correction step, changing the fictive temperature prediction equation into a fictive temperature prediction equation represented using a relaxation time of the temperature newly obtained in the temperature calculation step.

According to a fourteenth aspect of the present invention, in the temperature measuring method according to any one of the eleventh to thirteenth aspects of the present invention, the fictive temperature of the optical fiber is set in advance to a temperature that is the same as or similar to a temperature of a measurement object that is an object whose temperature is measured.

According to a fifteenth aspect of the present invention, in the temperature measuring method according to any one of the eleventh to fourteenth aspects of the present invention, the temperature measuring method may further include: measuring the temperature of the optical fiber by at least one temperature measuring element.

According to a sixteenth aspect of the present invention, in the temperature measuring method according to the fifteenth aspect of the present invention, the temperature measuring method may further include: a temperature correction step of correcting the temperature obtained in the temperature calculation step using the temperature measured by the temperature measuring element.

According to a seventeenth aspect of the present invention, in the temperature measuring method according to the fifteenth aspect of the present invention, the temperature measuring method may further include: a diagnosing step of comparing the temperature obtained in the temperature calculation step with the temperature measured by the temperature measuring element and diagnosing a soundness of the temperature measuring device or a soundness of the temperature measuring element.

According to an eighteenth aspect of the present invention, in the temperature measuring method according to the seventeenth aspect of the present invention, the temperature measuring method may further include: in the diagnosing step, diagnosing that there is an abnormality in the temperature measuring device when a temperature difference between the temperature obtained in the temperature calculation step and the temperature measured by the temperature measuring element is greater than a predetermined value at all or most of locations where the temperature measuring elements are installed; and in the diagnosing step, diagnosing that there is an abnormality in the temperature measuring elements when the temperature difference is greater than the predetermined value at only one location or several locations where the temperature measuring elements are installed.

According to a nineteenth aspect of the present invention, in the temperature measuring method according to any one of the eleventh to eighteenth aspects of the present invention, the temperature measuring method may further include: in the analysis step, obtaining the Brillouin frequency shift amount at each of a plurality of measurement positions set in a length direction of the optical fiber; in the correction step, predicting the amount of change at each of the measurement positions based on a thermal history at each of the measurement positions and correcting the Brillouin frequency shift amount at each of the measurement positions obtained in the analysis step using the amount of change at each of the predicted measurement positions, and in the temperature calculation step, obtaining a temperature at each of the measurement positions on the basis of the Brillouin frequency shift amount at each of the measurement positions corrected in the correction step.

According to a twentieth aspect of the present invention, in the temperature measuring method according to the eleventh to nineteenth aspects of the present invention, the temperature measuring method may further include: executing, by a hardware processor, a program to implement functions of the acquisition step, the analysis step, the correction step, and the temperature calculation step.

According to the present invention, it is possible to perform a temperature measurement in a high-temperature environment with high accuracy over a long period of time.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A temperature measuring device comprising:
a hardware-processor configured to execute a program to implement:
an acquirer configured to acquire spectrum data that indicates a spectrum of Brillouin scattered light generated by causing light to be incident on an optical fiber;
an analyzer configured to analyze the spectrum data and to obtain a Brillouin frequency shift amount;
a corrector configured to predict an amount of change in the Brillouin frequency shift amount due to structural relaxation of the optical fiber from a thermal history of the optical fiber, and configured to correct the Brillouin frequency shift amount obtained by the analyzer using the predicted amount of change; and
a temperature calculator configured to obtain a temperature of the optical fiber on the basis of the Brillouin frequency shift amount corrected by the corrector.

2. The temperature measuring device according to claim 1,
wherein the corrector predicts the amount of change using a fictive temperature prediction equation that indicates a time-dependent change in a fictive temperature of the optical fiber represented using a fictive temperature in an initial state of the optical fiber and a relaxation time for each temperature.

3. The temperature measuring device according to claim 2,
wherein when a difference between a temperature newly obtained by the temperature calculator and a temperature previously obtained by the temperature calculator is greater than a predetermined threshold value, the corrector changes the fictive temperature prediction equation into a fictive temperature prediction equation represented using a relaxation time of the temperature newly obtained by the temperature calculator.

4. The temperature measuring device according to claim 1,
wherein a fictive temperature of the optical fiber is set in advance to a temperature that is the same as or similar to a temperature of a measurement object that is an object whose temperature is measured.

5. The temperature measuring device according to claim 1, further comprising:
at least one thermocouple configured to measure the temperature of the optical fiber.

6. The temperature measuring device according to claim 5, wherein the hardware-processor is configured to execute the program to further implement:
a temperature corrector configured to correct the temperature obtained by the temperature calculator using the temperature measured by the thermocouple.

7. The temperature measuring device according to claim 5, wherein the hardware-processor is configured to execute the program to further implement:
a diagnoser configured to compare the temperature obtained by the temperature calculator with the temperature measured by the thermocouple and to diagnose a soundness of the temperature measuring device or a soundness of the thermocouple.

8. The temperature measuring device according to claim 7,
wherein the diagnoser diagnoses that there is an abnormality in the temperature measuring device when a temperature difference between the temperature obtained by the temperature calculator and the temperature measured by the thermocouple is greater than a predetermined value at all or most of locations where the thermocouples are installed, and
wherein the diagnoser diagnoses that there is an abnormality in the thermocouples when the temperature difference is greater than the predetermined value at only one location or several locations where the thermocouples are installed.

9. The temperature measuring device according to claim 1,
wherein the analyzer obtains the Brillouin frequency shift amount at each of a plurality of measurement positions set in a length direction of the optical fiber, wherein the corrector predicts the amount of change at each of the measurement positions based on a thermal history at each of the measurement positions and corrects the Brillouin frequency shift amount at each of the measurement positions obtained by the analyzer using the amount of change at each of the predicted measurement positions, and wherein the temperature calculator obtains a temperature at each of the measurement positions on the basis of the Brillouin frequency shift amount at each of the measurement positions corrected by the corrector.

10. A temperature measuring method performed by a temperature measuring device having a non-transitory computer-readable medium storing computer-readable instructions that, when executed by a hardware-processor, causes the hardware-processor to generate temperature calculations of an optical fiber, the computer-readable medium, comprising:

an acquisition step of acquiring spectrum data that indicates a spectrum of Brillouin scattered light generated by causing light to be incident on an optical fiber;

an analysis step of analyzing the spectrum data and obtaining a Brillouin frequency shift amount;

a correction step of predicting an amount of change in the Brillouin frequency shift amount due to structural relaxation of the optical fiber from a thermal history of the optical fiber, and correcting the Brillouin frequency shift amount obtained in the analysis step using the predicted amount of change; and a temperature calculation step of obtaining a temperature of the optical fiber on the basis of the Brillouin frequency shift amount corrected in the correction step.

11. The temperature measuring method according to claim 10, further comprising:

in the correction step, predicting the amount of change using a fictive temperature prediction equation that indicates a time-dependent change in a fictive temperature of the optical fiber represented using a fictive temperature in an initial state of the optical fiber and a relaxation time for each temperature.

12. The temperature measuring method according to claim 11, further comprising:

when a difference between a temperature newly obtained in the temperature calculation step and a temperature previously obtained in the temperature calculation step is greater than a predetermined threshold value, in the correction step, changing the fictive temperature prediction equation into a fictive temperature prediction equation represented using a relaxation time of the temperature newly obtained in the temperature calculation step.

13. The temperature measuring method according to claim 10, wherein a fictive temperature of the optical fiber is set in advance to a temperature that is the same as or similar to a temperature of a measurement object that is an object whose temperature is measured.

14. The temperature measuring method according to claim 10, further comprising:

measuring the temperature of the optical fiber by at least one thermocouple.

15. The temperature measuring method according to claim 14, further comprising:

a temperature correction step of correcting the temperature obtained in the temperature calculation step using the temperature measured by the thermocouple.

16. The temperature measuring method according to claim 14, further comprising:

a diagnosing step of comparing the temperature obtained in the temperature calculation step with the temperature measured by the thermocouple and diagnosing a soundness of the temperature measuring device or a soundness of the thermocouple.

17. The temperature measuring method according to claim 16, further comprising:

in the diagnosing step, diagnosing that there is an abnormality in the temperature measuring device when a temperature difference between the temperature obtained in the temperature calculation step and the temperature measured by the thermocouple is greater than a predetermined value at all or most of locations where the thermocouples are installed; and in the diagnosing step, diagnosing that there is an abnormality in the thermocouples when the temperature difference is greater than the predetermined value at only one location or several locations where the thermocouples are installed.

18. The temperature measuring method according to claim 10, further comprising:

in the analysis step, obtaining the Brillouin frequency shift amount at each of a plurality of measurement positions set in a length direction of the optical fiber;

in the correction step, predicting the amount of change at each of the measurement positions based on a thermal history at each of the measurement positions and correcting the Brillouin frequency shift amount at each of the measurement positions obtained in the analysis step using the amount of change at each of the predicted measurement positions, and in the temperature calculation step, obtaining a temperature at each of the measurement positions on the basis of the Brillouin frequency shift amount at each of the measurement positions corrected in the correction step.

19. The temperature measuring method according to claim 10, further comprising:

executing, by a hardware processor, a program to implement functions of the acquisition step, the analysis step, the correction step, and the temperature calculation step.

* * * * *